United States Patent [19]

Booher

[11] Patent Number: 4,616,879
[45] Date of Patent: Oct. 14, 1986

[54] DUMP TRAILER WITH QUIET CUSHIONS

[76] Inventor: Howard Booher, P.O. Box 277, Randolph, Ohio 44265

[21] Appl. No.: 591,929

[22] Filed: Mar. 21, 1984

[51] Int. Cl.$^4$ .............................................. B60P 1/16
[52] U.S. Cl. ..................................... 298/10; 296/184;
 298/1 R; 298/22 R; 414/469; 293/136
[58] Field of Search .................. 298/17 R, 1 R, 21 R,
 298/22 R, 22 P, 38, 20 R, 10, 11, 17.5, 17 B, 17
 S, 17 SG, 17.6, 17.7, 17.8, 18, 19 B, 19 V, 22 C,
 22 F, 22 J, 22 A, 22 B, 22 D; 248/636, 615, 611,
 613, 560, 633; 296/184, 35.1, 35.2, 35.3, 41, 189,
 203, 204, 174; 105/261 A, 271; 414/469, 489,
 490, 492, 493, 494; 220/85 K, 1.5; 293/136, 120

[56] References Cited

U.S. PATENT DOCUMENTS

| 1,957,497 | 5/1934 | Galanot .............................. 296/184 |
| 2,490,532 | 12/1949 | Maxon, Jr. ......................... 298/22 P |
| 3,274,450 | 9/1966 | Siebold ............................ 248/615 X |
| 3,355,043 | 11/1967 | Talbert ................................ 414/469 |
| 3,552,798 | 1/1971 | Cole et al. ........................ 298/22 R |
| 3,622,194 | 11/1971 | Bryk ................................ 248/611 X |
| 3,777,438 | 12/1973 | Brown ............................. 293/120 X |
| 3,907,351 | 9/1975 | Pozelt et al. .................... 293/136 X |
| 4,273,381 | 6/1981 | Bibean et al. .................... 296/184 X |
| 4,460,205 | 7/1984 | Glance ............................ 293/136 X |

FOREIGN PATENT DOCUMENTS

| 1096218 | 12/1960 | Fed. Rep. of Germany ..... 296/35.1 |
| 0114622 | 9/1980 | Japan ................................ 296/184 |
| 59-543 | 4/1984 | Japan ................................ 293/120 |
| WO82/03434 | 10/1982 | PCT Int'l Appl. ................ 248/615 |

Primary Examiner—Frank E. Werner
Attorney, Agent, or Firm—Harpman & Harpman

[57] ABSTRACT

A dump trailer having a chassis with ground engaging wheels under one end, a heavy duty hoist on the other end and a dump body pivoted to the chassis at the wheel supported end and adapted to be elevated by the heavy duty hoist incorporates a floor structure in the body including longitudinal and transverse frame members and provides resilient cushions on each of the transverse frame members of the body where they rest on the chassis when the body is in normal transport position.

5 Claims, 4 Drawing Figures

DUMP TRAILER WITH QUIET CUSHIONS

BACKGROUND OF THE INVENTION

1. Technical Field

This invention relates to dump trailers wherein the chassis and dump body are pivoted to one another and means is provided for elevating the dump body to effect the gravity discharge of material therein through an opened tailgate or the like and wherein the dump body is carried directly by the chassis in transport position.

2. Description of the Prior Art

Dump body trailers have been produced in various lengths and capacities and consist of a chassis formed principally of parallel spaced I-beams and a plurality of cross frame members joining the same with ground engaging wheel assemblies under one end of the chassis and retractable support gear inwardly of the other end. Dump bodies comprising a floor structure incorporating longitudinal and cross frame members and a floor thereon with side walls and a front end wall secured thereto are pivotally mounted on the chassis adjacent the rear end thereof and a hoist, usually hydraulically actuated, is positioned between the chassis and the front end of the dump body to elevate the same. The longitudinal frame members of the dump body are spaced with respect to one another a distance greater than the width of the chassis so that when the body is in transport position on the chassis, the longitudinal frame members of the body lie parallel with and along the outer opposite sides of the frame members of the chassis with the cross frame members of the body resting on the parallel spaced I-beams of the chassis.

In such position, an empty dump trailer body continually moves toward and away from the chassis in a bouncing action as occasioned by irregularities in a roadway over which the trailer is being moved by a tractor or the like. The continual bouncing movement or motion of the trailer body with respect to the chassis results in rapid wear and frequent stuctural damage to the frame members of the body and particularly the cross frame members that normally directly engage the longitudinal beams of the chassis.

Proposals have been made to apply sections of belting material or the like to the upper surfaces of the longitudinal beams of the chassis and various latches have been proposed in attempts to hold the dump body firmly on the chassis. None of these proposals have proved practical in everyday operation of a dump trailer.

This invention provides a plurality of individual cushioning members formed of a durable resilient synthetic resin and attached to the cross frame members of the dump trailer body alongside the longitudinally extending frame members thereof where they will individually cushion each of the cross frame members of the body where they rest on the I-beams of the chassis with the U-shaped configuration of the individual cushion members extending upwardly along the sides of the cross frame members of the body and secured thereto so as to retain the individual cushion members in desired positioning between the cross frame members of the body and the beams of the chassis when the dump body is in transport position resting thereon.

SUMMARY OF THE INVENTION

A dump trailer with quiet cushions positions U-shaped individual cushion members on each of the plurality of cross frame members of a dump trailer body alongside the longitudinal frame members thereof where the individual cushion members will engage the parallel spaced I-beams of the chassis and prevent wear of the respective metal parts of the dump body and chassis and eliminate the noise heretofore occurring from the bouncing and like movement of the dump body toward and away from the spaced I-beams of the chassis when the dump trailer is moved along the uneven surface of a roadway or the like. Unique fastening configurations of the individual cushion members insure the retention of the same in the desired locations.

DESCRIPTION OF THE PREFERRED EMBODIMENT

Figure 1:
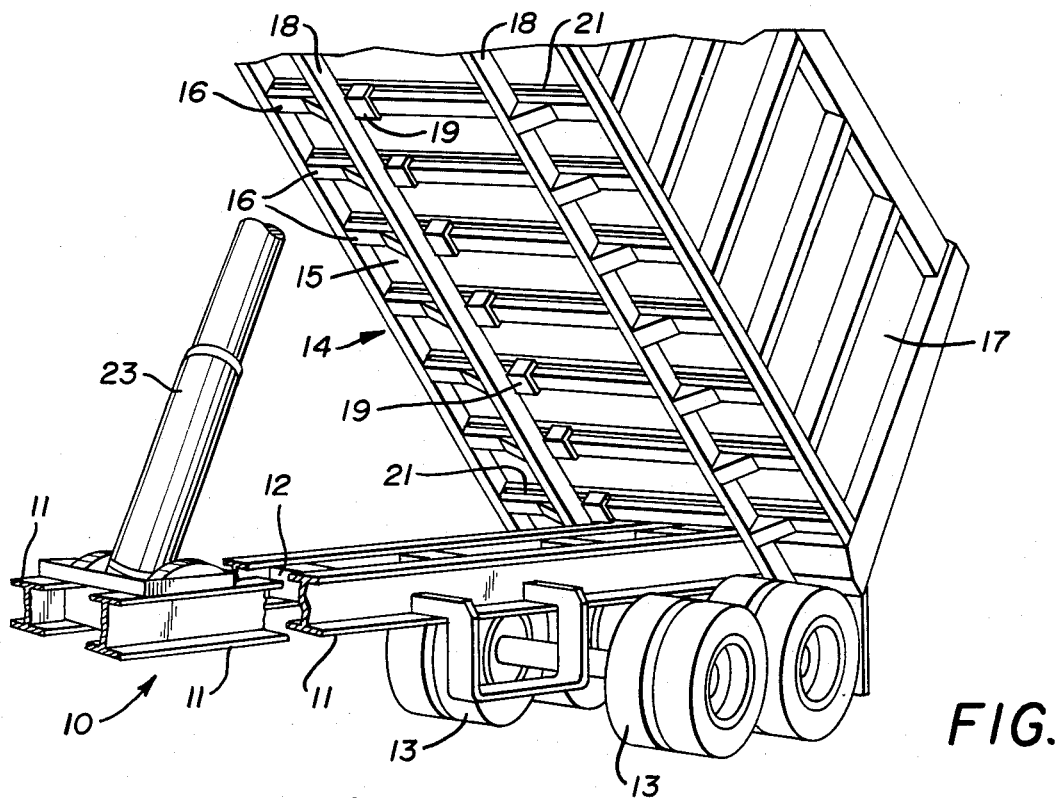
FIG. 1 is a perspective view of a portion of a dump trailer chassis and a portion of a dump body pivoted thereto and shown in elevated relation thereto.

By referring to the drawings and FIG. 1 in particular, it will be seen that a portion of a chassis 10 of a dump trailer is illustrated as comprising spaced parallel I-beams 11 with cross frame members 12 therebetween and ground engaging wheel assemblies 13 below the back end of the chassis 10.

A dump body 14 comprising a floor 15 positioned on a plurality of spaced cross frame members 16 supports a pair of side walls 17 with the back end of the dump body, to the right as seen in FIG. 1 of the drawings, defining an opening through which material in the dump body will move by gravity when the dump body is elevated as illustrated in FIG. 1 by a hydraulic piston and cylinder assembly 23.

Those skilled in the art will observe that the opening at the back end of the dump body is usually closed with a pivoted tailgate or the like and that the front end of the dump body, now shown, is provided with the usual front wall. The cross frame members 16 of the dump body are secured to longitudinal frame members 18 which are arranged in spaced parallel relation to one another with the distance therebetween being slightly greater than the overall width of the chassis as defined by the parallel spaced I-beams 11 so that when the dump body is in horizontal, transport position, the longitudinal frame members 18 lie along the outer opposite sides of the parallel spaced I-beams 11 of the chassis 10.

Still referring to FIG. 1 of the drawings, it will be seen that a plurality of distortable individual resilient cushion members 19 are attached to the cross frame members 16 where each of the cross frame members 16 will engage the upper surface of the parallel spaced I-beams 11 of the chassis 10 when the dump body is in horizontal transport position and resting on the chassis 10.

Figure 2:
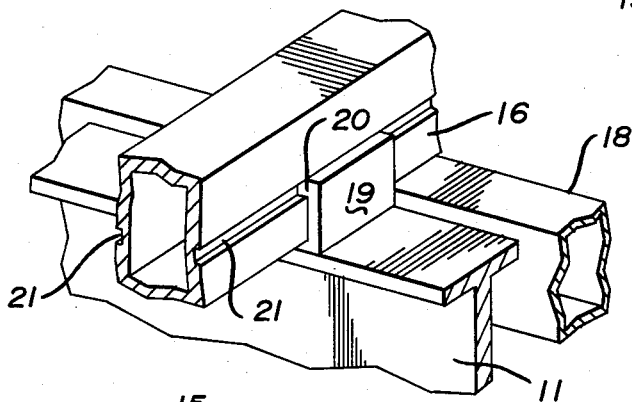
FIG. 2 is an enlarged perspective view of a portion of one of the parallel spaced I-beams of the chassis and one of the several cross frame members of the dump body in transport relation with an individual cushion member positioned therebetween.
Figure 3:
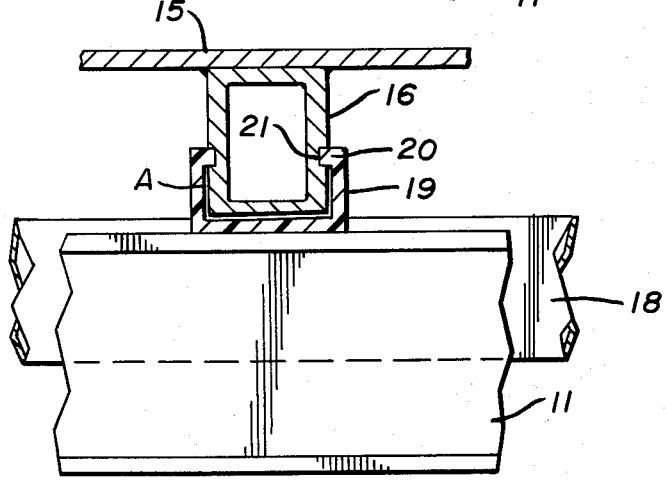
FIG. 3 is an enlarged plan view of a portion of one of the parallel spaced I-beams of the chassis showing in cross section one of the cross frame members of the dump body, a portion of the floor carried thereby and an individual cushion member between the cross frame member and the I-beam.

By referring now to FIGS. 2 and 3 of the drawings, it will be seen that the individual resilient cushion members 19 are U-shaped in end elevation and cross section each having a base with spaced upstanding arms and that longitudinally extending short flanges 20 extend inwardly of the ends of the arms of the individual resilient cushion members 19 and register with longitudinally extending shallow grooves 21 in the outer opposite sides of the cross frame members 16. The grooves 21 in the cross frame member 16 and the portions of the cross frame member 16 below the grooves 21 are thus the same configuration as the distortable individual cushion members 19 with their inturned flanges 21.

The individual cushion members 19 are preferably formed of a durable resilient synthetic resin, such as polyurethane, and of a cross sectional thickness sufficient to insure the continued registry of the flanges 20 in the grooves 21 so as to tightly clamp each of the individual cushion members 19 in desired location on the cross frame members 16 and provide a sufficient thickness of the resilient durable synthetic resin to adequately cushion the dump body with respect to the chassis and maintain the desired spacing of the metal cross frame members 16 and the I-beams 11.

Figure 4:
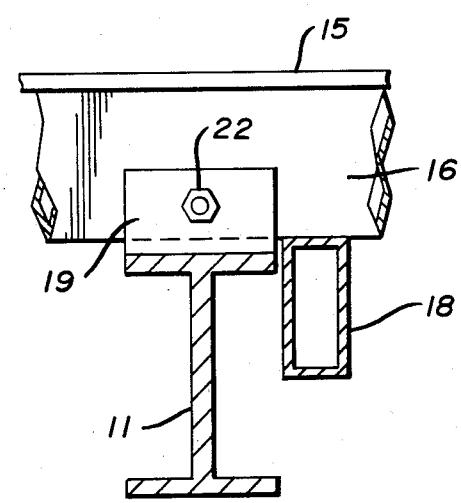
FIG. 4 is a side elevation of a portion of a cross frame member of a dump body, a portion of the floor thereon, and a cross section of one of the I-beams of the chassis showing an individual cushion member positioned therebetween and a fastener securing the cushion member to the cross frame member as a modification.

The preferred embodiment illustrated and described herein is formed in new dump body constructions at the time of manufacture and if desired an adhesive A (see FIG. 3) can be positioned between the individual cushion members 19 and the cross frame members 16 to insure their positioning as described and illustrated. In applying the invention to existing dump body trailers, the cross sectionally U-shaped individual resilient cushion members 19 are formed without the inturned flanges 20 and are provided with apertures midway of the arms of the individual cushion members so that bolt and nut assemblies can be positioned therethrough as shown in FIG. 4 of the drawings wherein the head of a bolt 22 is illustrated, it being understood that the bolt extends through the frame 16 and all the individual resilient cushion members 19 and is provided with a lock washer and nut or similar fastener on the opposite side. The modification of FIG. 4 of the drawings can be applied to cross frame members of various configurations including I-beams or channels as are sometimes found in dump body trailer constructions.

It will thus be seen that the provision of individual resilient cushion members 19 in a dump body trailer construction greatly reduces noise that otherwise occurs between an empty dump body and the chassis and practically eliminates wear between the heretofore engaging portions of the dump body and the chassis and additionally contributes to the life of the dump body and chassis by providing high impact absorption between the same. The individual resilient cushion members 19 can be quickly and easily installed in new trailer constructions through the use of the mutually engaging flanges and grooves 20 and 21 respectively as described herein or in existing dump body trailers by bolt-on fastening or other mechanical fasteners or by adhesive fastening as will occur to those skilled in the art, a suitable adhesive is cyanoacrylate, available commercially as "EASTMAN 900", a product of Eastman Kodak Company, Rochester, N.Y. 14650.

Having thus described my invention, what I claim is:

1. An improvement in a dump trailer, said dump trailer comprising a chassis having longitudinally extending beams with ground engaging wheels under one end and a dump body pivoted to said chassis, said dump body having cross frame members transversely thereof and transversly of said longitudinally extending beams, said cross frame members each having side walls, and means for elevating said dump body with respect to said chassis; the improvement comprising means for preventing direct contact of said cross frame members of said dump body with said longitudinally extending beams of said chassis, said means consisting of grooved means defined in said cross frame members side walls, and a plurality of resilient cushion members having flanges located thereon for engagement with said grooved means, a plurality of said cushion members being positioned on each of a plurality of said cross frame members of said dump body, each of said cushion members being located to be interposed between each of said plurality of cross frame members and corresponding ones of said longitudinally extending beams of said chassis when said dump body is positioned on said chassis whereby essentially all contact between said plurality of dump body cross frame members and said chassis longitudinally extending beams is prevented, said plurality of cross frame members of said dump body being of a known cross sectional configuration and each of said plurality of said resilient cushion members being formed in a cross sectional configuration substantially the same as the cross sectional configuration of said plurality of cross frame members and are distorted and placed on said plurality of cross frame members so as to be self-securing with respect thereto.

2. The improvement in a dump trailer set forth in claim 1 and wherein said resilient cushion members include oppositely disposed upwardly extending arms.

3. The improvement in a dump trailer set forth in claim 1 and wherein said resilient cushion members are formed of synthetic resin and are of a thickness to space said cross frame members of said dump body with respect to said longitudinally extending beams of said chassis when said dump body is empty and loaded.

4. The improvement in a dump trailer set forth in claim 1 including upturned tabs on said cushion members for registry with the opposite sides of said cross frame members and fastening means engaging said tabs and said cross frame members.

5. The improvement in a dump trailer set forth in claim 1 further including adhesive positioned between said resilient cushion members and said cross frame members.

* * * * *